Jan. 31, 1967   O. WEISE   3,300,930
DEVICE FOR SPACING APART REINFORCING
INSERTS IN REINFORCED CONCRETE
Filed Feb. 25, 1964   2 Sheets-Sheet 1

Jan. 31, 1967   O. WEISE   3,300,930
DEVICE FOR SPACING APART REINFORCING
INSERTS IN REINFORCED CONCRETE
Filed Feb. 25, 1964   2 Sheets-Sheet 2

United States Patent Office 3,300,930
Patented Jan. 31, 1967

3,300,930
DEVICE FOR SPACING APART REINFORCING INSERTS IN REINFORCED CONCRETE
Oskar Weise, Upper Bavaria, Germany, assignor to Albert Geser, Manufacturer, Sankt Gallen, Switzerland
Filed Feb. 25, 1964, Ser. No. 347,164
Claims priority, application Germany, Feb. 25, 1963, W 33,968
3 Claims. (Cl. 52—309)

The invention relates to a device for spacing apart reinforcing inserts in reinforced concrete, which device comprises a spacer part and a retaining clip. The spacer part is placed against the reinforcing insert such as a steel rod on which it can be held in position by a retaining clip, and the reinforcing insert may be held at a determined distance from the shuttering used for the production of structural parts made of reinforced concrete.

One known spacer for reinforcing inserts for reinforced concrete consists of a semi-circular spacing part and a semicircular non-resilient retaining clip. The spacing part is placed laterally against the reinforcing steel rod, and is held in position thereon by the retaining clip, and the reinforcing insert is held at a determined distance from the shuttering used for the manufacture of reinforced concrete. The semicircular spacing part and the semicircular retaining clip are made of a synthetic resin, and their ends are provided with pins and boreholes. They can be secured to each other by pressing the pins into the boreholes, and thus joined form a closed circular ring by which the reinforcing rod is firmly enclosed and clamped in position. The disadvantages of the known spacer arise from its substantially bulky construction and correspondingly large volume, so that the use of such spacers reduces unduly the stability of the structural parts made of reinforced concrete. Thus, for example, with reinforcing rods of the usual diameter of 20 mm. and a 40 mm. concrete cover, this spacer has a diameter of 120 millimetres, so that it is obviously unsuitable for the above reasons. The spacer has the additional disadvantage that its mounting on a reinforcing steel rod involves considerable expenditure of work and time, since the spacing member and the retaining clip have to be secured to each other by a special tool and with a substantial amount of effort in order to obtain the necessary press fit of the parts to be joined. There is, finally, the risk of the spacer mounted on the reinforcing rod being displaced or destroyed, since by reason of its bulky construction in comparison with its potential physical properties, the spacer has a particularly large working surface on to which the concrete mass drops when it is poured between the shutterings, the spacer thus being exposed to substantial stresses.

It is among the objects of the invention to provide a device for spacing apart reinforcing inserts for reinforced concrete, in which the disadvantages hereinbefore referred to are avoided, and which has the properties that spacers generally are known to have.

In accordance with the invention, this object is achieved by providing a device for spacing apart reinforcing inserts for reinforced concrete which comprises essentially a spacing part and a retaining clip. The spacing part is placed against the reinforcing insert and is held in position thereon by the retaining clip, and the reinforcing insert may be held at a determined distance from the shuttering used for the production of reinforced concrete. The spacing member has spacing arms with unsupported ends which rest on the shuttering, and is provided with engaging notches or teeth, in which the retaining clip may be inserted and held in position. The retaining clip is provided with arm-like resilient clip-ends which are provided with retaining notches or teeth by which the retaining clip is forced into engagement with the engaging notches or teeth provided on the spacing part and held in position thereon, and by means of which retaining notches or teeth the spacing member can be clamped in position on the reinforcing insert.

One construction of the device for spacing apart reinforcing inserts for reinforced concrete according to the invention is illustrated by way of example in the accompanying drawings, in which.

Figure 1:
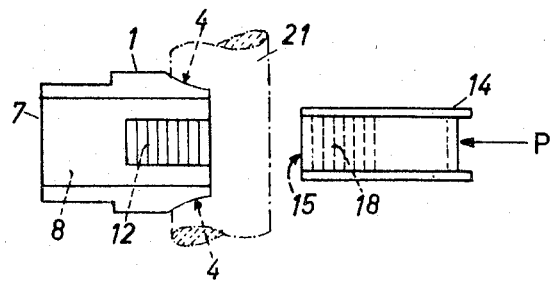
FIGURE 1 shows a longitudinal view of the device connected to a reinforcing rod, part of which is shown in the drawing. The device is placed laterally against the reinforcing rod, and the retaining clip is still not in its retaining position.
Figure 2:
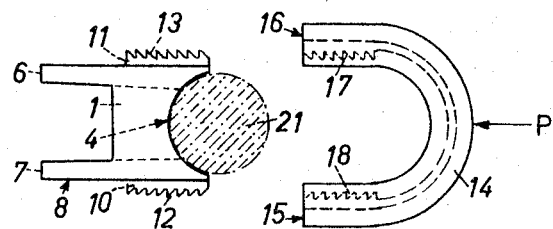
FIGURE 2 is a plan view of the device illustrated in FIGURE 1.
Figure 3:
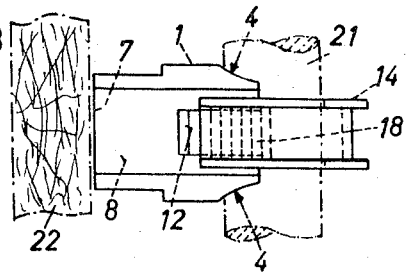
FIGURE 3 shows a longitudinal view of the device illustrated in FIGURES 1 and 2, as secured to a reinforcing rod, and a fragmentary view of shuttering; the device and the retaining clip are secured to each other.
Figure 4:
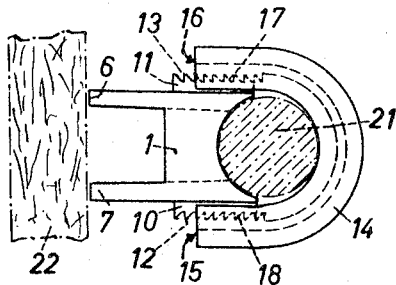
FIGURE 4 is a plan view of the device illustrated in FIGURE 3, as secured to the reinforcing rod, together with shuttering.
Figure 5:
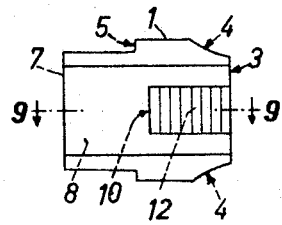
FIGURE 5 shows a longitudinal view of the device.
Figure 6:
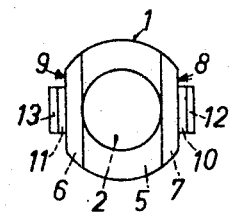
FIGURE 6 is a left-hand end-elevation view of the device illustrated in FIGURE 5.
Figure 7:
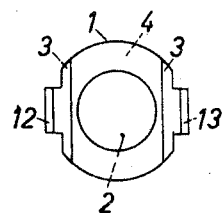
FIGURE 7 is a right-hand end-elevation view of the device illustrated in FIGURE 5.
Figure 8:
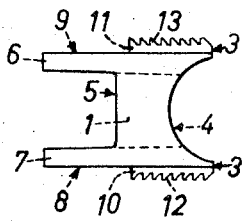
FIGURE 8 is a plan view of the device illustrated in FIGURE 5.
Figure 9:
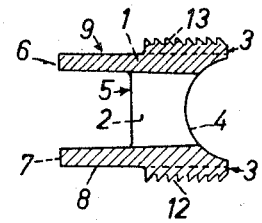
FIGURE 9 is a longitudinal section of the device illustrated in FIGURES 5 to 8 on the line 9—9 in FIGURE 5.
Figure 10:
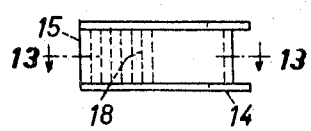
FIGURE 10 shows a longitudinal view of the retaining clip.
Figure 11:
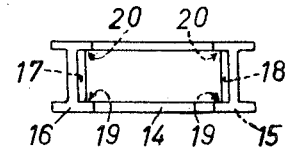
FIGURE 11 shows a front elevation of the retaining clip illustrated in FIGURE 10.
Figure 12:
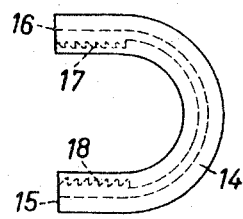
FIGURE 12 is a plan view of the retaining clip illustrated in FIGURE 10.
Figure 13:
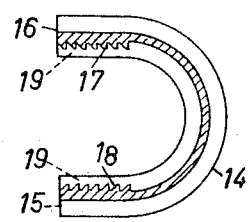
FIGURE 13 is a longitudinal section through the retaining clip illustrated in FIGURES 10 to 12 on the line 13—13 of FIGURE 10.

The device illustrated in FIGURES 1 to 13 comprises a spacing part 1 (FIGURES 1 to 9) and a retaining clip 14 (FIGURES 1 to 4 and FIGURES 10 to 13). The spacing part 1 is placed laterally against the reinforcing steel rod 21 (FIGURES 1–2) on which it may be held in position by the retaining clip 14. The annular spacing part 1 (FIGURES 5 to 9) is preferably made of a shock-resistant synthetic resin; it has a passage 2. One end 3 of the spacing part is provided with a depression 4 by means of which the spacing part (FIGURES 1 to 4) can be placed laterally against a reinforcing steel rod 21 (FIGURES 1 to 4). At the other end 5 disposed opposite the depression 4, the spacing part 1 has two spacing arms 6 and 7 with unsupported ends with which the spacing part 1 contacts the shuttering 22 and by which the reinforcing steel rod 21 may be held at a determined distance from the shuttering 22. At positions adjacent the end 3, the spacing part has two parallel side walls 8 and 9, and guide bars 10 and 11, by which the retaining clip 14 is guided and held in position, being respectively provided on the side walls 8 and 9. The guide bars 10 and 11 are respectively formed with engaging teeth 12 and 13 in the form of notches or ratchets which are provided side by side, and with which the retaining clip 14 may interengage, and by which the clip may be held in position on the spacing part 1. The retaining clip 14 (FIGURES 10 to 13) is made of a synthetic resin of high elasticity and ultimate stress values, for example polyvinyl chloride or the like. The clip is of double-T section with a semicircular intermediate part and two straight clip ends 15 and 16 having unsupported ends, the clip ends 15 and 16 extending in parallel relation and being of a resilient construction. On the inside of the clip, the clip ends 15 and 16 of the retaining clip 14 are provided with retaining teeth 17 and 18 which are provided side by side, and by which the resilient retaining clip 14 may be forced into engagement with the teeth 12 and 13 provided on the spacing part 1, and held in position thereon, as shown in FIGURES 3 and 4. In order to ensure that the retaining clip sits securely on the spacing part 1, retaining surfaces 19 and 20 are respectively provided on the clip ends 15 and 16 at positions adjacent the retaining teeth 17 and 18, and by these retaining surfaces of the retaining clip 14 is slid on to, and guided and held in position on the spacing part 1.

The use and performance of the device are as follows:

If a reinforcing rod for reinforced concrete is to be provided with a spacer, the user holds the spacing part 1 in his left hand and places it with the depression 4 (FIGURES 1–5, 7–9) laterally against the reinforcing rod 21. The user then holds the retaining clip 14 by the right hand, and slides it with the clip ends 15, 16 the retaining surfaces 19 and 20, and the retaining teeth 17, 18 laterally on to the guide bars 10 and 11 and the engaging teeth 12, 13 of the spacing part 1, the retaining clip 14 being slid by a pressure P applied to the intermediate part of the retaining clip 14, over the largest possible portion of the spacing part 1, so that the retaining teeth 17, 18 of the retaining clip 14 interengage with the teeth 12, 13 provided on the spacing part 1 (FIGURES 3, 4) on which the retaining clip 14 is held in position by tension, the spacing part 1 being simultaneously clamped in position on the reinforcing steel rod 21, and the fitting of the device on the reinforcing steel rod 21 being thus completed.

I claim:

1. In the construction of reinforced concrete structures shaped by means of shuttering forms or the like, a device spacing the reinforcing inserts for the concrete a predetermined distance from the shuttering comprising, in combination: a spacing member maintaining a predetermined distance between the shuttering and the reinforcing insert, said spacing member comprising a main body portion, one end of said body portion having a recess receiving the reinforcing insert and locating said spacing member generally transversely of said insert, the end of said body portion opposite to the recessed end having a pair of spaced apart arms extending longitudinally therefrom and adapted to bear against the shuttering, two opposed exterior side surfaces of said body portion having guide bars thereon extending longitudinally of said body portion, and tooth means formed on said guide bars; and a retaining member adapted to be positioned transversely of said reinforcing insert opposite said spacing member and in lockable engagement with said spacing member, said retaining member comprising a generally arcuate retainer clip adapted to encircle a substantial portion of said insert and having resilient end portions extending transversely of said insert, the interior surfaces of the clip ends being provided with retaining tooth means adapted to lockably interengage said tooth means on said guide bars of said spacing member.

2. A device as claimed in claim 1, wherein said retainer clip includes a semi-circular intermediate portion and said end portions are disposed in generally parallel relationship, said end portions including guide surfaces extending inwardly therefrom adjacent said tooth means, said guide surfaces adapted to slide on the longitudinal side surfaces of said guide bars to thereby guide the respective tooth means of said spacing member and said retaining member into locking interengagement and to hold said spacing member and said retaining member in locked position about said reinforcing insert.

3. A device according to claim 1, wherein said spacing member is made of a shock-resistant synthetic resin material and said retaining clip member is made of a synthetic resin material having high elasticity and ultimate stress properties.

References Cited by the Examiner

UNITED STATES PATENTS 2,915,267 12/1959 Kaysing _____ 24—263
3,191,345 6/1965 Schwachula _____ 52—309

FOREIGN PATENTS 679,938 1939 Germany.
1,244,183 1960 France.

FRANK L. ABBOTT, *Primary Examiner.*

JOHN E. MURTAGH, *Examiner.*